(12) United States Patent
Venkataramani et al.

(10) Patent No.: US 8,307,267 B2
(45) Date of Patent: Nov. 6, 2012

(54) PROGRAMMABLE SOFT-OUTPUT VITERBI ALGORITHM SYSTEM AND METHOD

(75) Inventors: Raman Venkataramani, Pittsburgh, PA (US); Alexander Kuznetsov, Pittsburgh, PA (US); Ara Patapoutian, Hopkinton, MA (US)

(73) Assignee: Seagate Technology LLC, Cupertino, CA (US)

( * ) Notice: Subject to any disclaimer, the term of this patent is extended or adjusted under 35 U.S.C. 154(b) by 1149 days.

(21) Appl. No.: 12/048,830

(22) Filed: Mar. 14, 2008

(65) Prior Publication Data
US 2009/0231745 A1 Sep. 17, 2009

(51) Int. Cl.
H03M 13/03 (2006.01)
(52) U.S. Cl. .................................. 714/795
(58) Field of Classification Search ............ 714/759
See application file for complete search history.

(56) References Cited

U.S. PATENT DOCUMENTS

| | | | | |
|---|---|---|---|---|
| 5,142,421 A * | 8/1992 | Kahlman et al. | ............... | 360/40 |
| 5,311,547 A * | 5/1994 | Wei | ............... | 375/290 |
| 5,621,761 A * | 4/1997 | Heegard | ............... | 375/265 |
| 6,252,731 B1 | 6/2001 | Sloan et al. | ............... | 360/31 |
| 6,513,141 B1 * | 1/2003 | Livingston | ............... | 714/792 |
| 6,757,122 B1 * | 6/2004 | Kuznetsov et al. | ............... | 360/53 |
| 6,791,995 B1 | 9/2004 | Azenkot et al. | ............... | 370/436 |
| 7,030,789 B1 * | 4/2006 | Cideciyan et al. | ............... | 341/83 |
| 7,050,418 B2 | 5/2006 | Lomp et al. | ............... | 370/342 |
| 7,237,173 B2 | 6/2007 | Morita et al. | ............... | 714/755 |
| 7,251,768 B2 | 7/2007 | Giannakis et al. | ............... | 714/755 |
| 2003/0066020 A1 | 4/2003 | Morita et al. | ............... | 714/794 |
| 2004/0068747 A1 * | 4/2004 | Robertson et al. | ............... | 725/98 |
| 2004/0233981 A1 * | 11/2004 | Porter et al. | ............... | 375/229 |
| 2006/0222094 A1 * | 10/2006 | Makhlouf et al. | ............... | 375/260 |
| 2006/0282753 A1 * | 12/2006 | Vasiliev | ............... | 714/794 |
| 2008/0188190 A1 * | 8/2008 | Prasad et al. | ............... | 455/114.3 |
| 2008/0240303 A1 * | 10/2008 | Shao et al. | ............... | 375/341 |
| 2009/0150746 A1 * | 6/2009 | Chaichanavong et al. | ............... | 714/752 |
| 2009/0225878 A1 * | 9/2009 | Papadopoulos et al. | ............... | 375/260 |

OTHER PUBLICATIONS

Ta, C. H. and Weiss, S. (2005) Design of Precoding and Equalisation for Broadband MIMO Transmission. In: 2nd IEE/EURASIP Conference on DSP Enabled Radio, Sep. 19-20, University of Southampton. 30/1-30/5.*

Hagenauer, & Papke, J. & L.; Decoding "Turbo"—Codes with the Soft Output Viterbi Algorithm (SOVA), IEEE Publication, 1994, p. 164.

Moon, & Park, J. & J.; "Pattern-Dependent Noise Prediction in Signal-Dependent Noise," IEEE *Journal on Selected Areas in Communications*, V. 19, N. 4, Apr. 2001. pp. 730-743.

Fossorier et al., M.; "On the Equivalence Between SOVA and Max-Log-MAP Decodings," *IEEE Communications Letters*, V. 2, No. 5, May 1998, pp. 137-139.

* cited by examiner

*Primary Examiner* — Scott Baderman
*Assistant Examiner* — Neil Miles
(74) *Attorney, Agent, or Firm* — Deirdre Megley Kvale; Westman, Champlin & Kelly, P.A.

(57) ABSTRACT

In a particular embodiment, a channel detector is disclosed that includes a programmable look-up table (LUT) to relate user bits to channel bits. The programmable LUT is adapted to be implemented on a state trellis of arbitrary radix. The channel detector further includes a sectional precoder coupled to a channel and having access to the programmable LUT. The sectional precoder is adapted to map channel bits to user bits and vice versa using a programmable LUT.

18 Claims, 8 Drawing Sheets

PROGRAMMABLE SOFT-OUTPUT VITERBI ALGORITHM SYSTEM AND METHOD

FIELD OF THE DISCLOSURE

The present disclosure is generally related to a programmable soft-output Viterbi algorithm (SOVA) system and method.

BACKGROUND

In general, modern electronic devices utilize storage devices, such as hard disc drives, to store vast amounts of data. As electronic devices have become smaller, data storage devices have been designed to store more data in less area. Typically, such storage devices include data channel circuitry to facilitate the transfer of data between the storage device and a host system, such as a processor, a computer, other electronic circuitry, or any combination thereof. Such data channel circuitry typically utilizes data decoding circuitry and error correction circuitry to reliably reproduce data written to and read from a storage medium, such as a rotatable magnetic disc media.

Within data detection circuits, the use of low-density parity check (LDPC) codes and iterative decoding is becoming commonplace in today's magnetic recording systems. In some instances, the channel detector circuitry uses a soft-output Viterbi algorithm (SOVA) detector to estimate hard decisions associated with channel bits of the readback signal. However, correlated bit errors in the detected output can adversely impact the efficiency of the SOVA detector.

Channel preceding is a technique for improving bit and sector failure rates in the presence of correlated bit errors; however, conventional SOVA detectors are not adapted to work with channel precoding, since the SOVA detector cannot be used to compute reliabilities (soft decisions) related to original unprecoded bits directly from reliabilities of the channel bits determined by the conventional SOVA.

SUMMARY

In a particular embodiment, a channel detector includes a programmable look-up table (LUT) to relate user bits to channel bits. The programmable LUT is adapted to be implemented on a state trellis of arbitrary radix. The channel detector further includes a sectional precoder coupled to a channel and having access to the programmable LUT. The sectional precoder is adapted to map channel bits to user bits and vice versa using a programmable LUT.

In another particular embodiment, a method is disclosed that includes mapping the user bits to channel bits via a programmable precoder during a write operation using a programmable look-up table (LUT) that is programmed to operating conditions associated with the channel. The method further includes receiving readback samples from a channel having inter-symbol interference, decoding the readback samples using a soft-output channel detector, and determining user bit decisions and their reliabilities using an integrated postcoder map specified by the programmable LUT. The method also includes outputting the determined user bit decisions.

In still another particular embodiment, a system includes an input to receive a signal including correlated noise and a channel detector coupled to the input. The channel detector includes a memory to store precoder instructions and a precoder having access to the memory and adapted to map channel bits to user bits and vice versa based on the precoder instructions. The channel detector further includes an inner decoder adapted to iteratively decode the channel bits into end-user data. The channel detector further includes an output terminal to provide an output including the end-user data.

DETAILED DESCRIPTION OF ILLUSTRATIVE EMBODIMENTS

Figure 1:
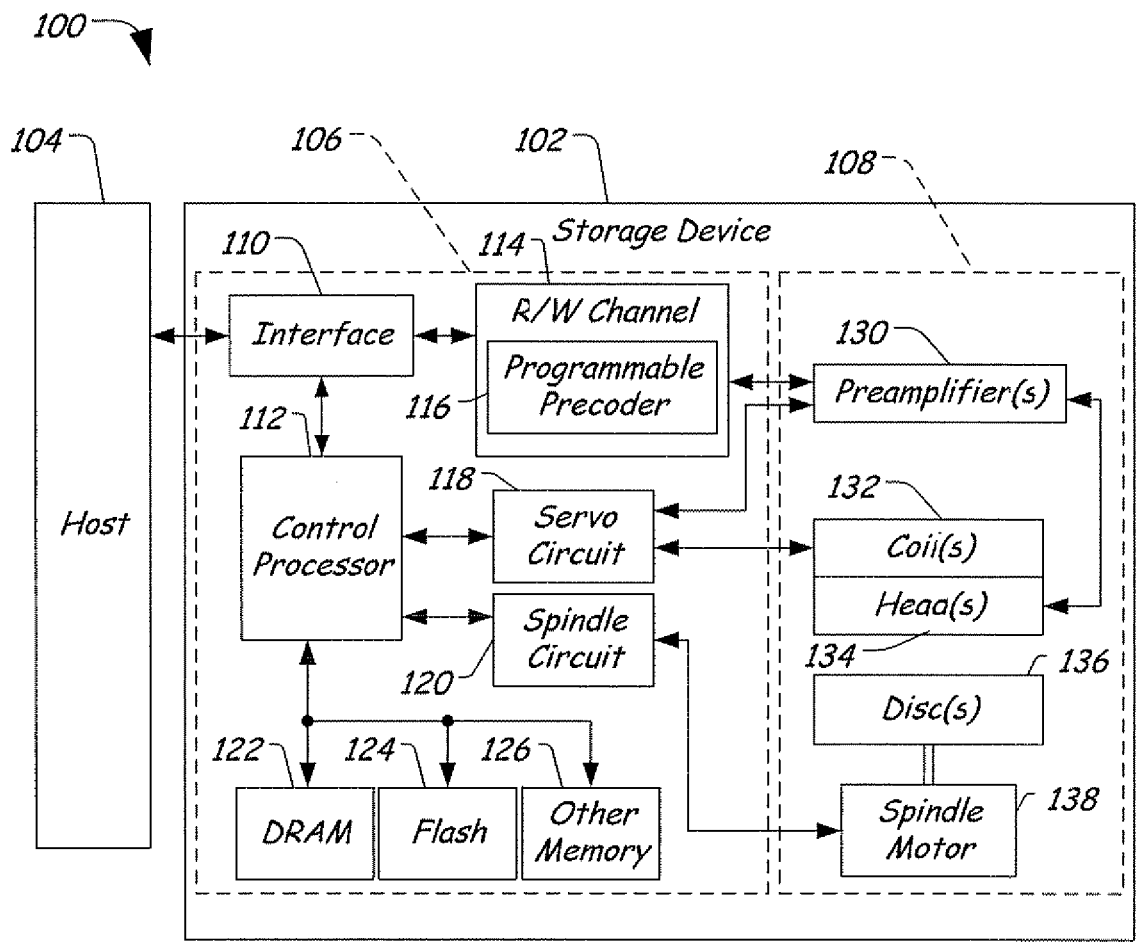
FIG. 1 is a block diagram of a particular illustrative embodiment of a system including a storage device having a read/write channel with a programmable precoder.

FIG. 1 is a block diagram of a particular illustrative embodiment of a system 100 including a storage device 102 having a read/write channel 114 with a programmable precoder 116. The storage device 102 is adapted to communicate with a host system 104. In a particular embodiment, the host system 102 can be a computer, a processor, a personal digital assistant (PDA), another electronic device, or any combination thereof.

The storage device 102 includes recording subsystem circuitry 106 and a head-disc assembly 108. The recording subsystem circuitry 106 includes an interface circuit 110, which includes a data buffer for temporarily buffering the data and a sequencer for directing the operation of the read/write channel 114 and the preamplifier 130 during data transfer operations. The interface circuit 110 is coupled to the host system 104 and to a control processor 112, which is adapted to control operation of the storage device 102. The control processor 112 is coupled to a servo circuit 118 that is adapted to control the position of one or more read/write heads 134 relative to one or more discs 136 as part of a servo loop established by the one or more read/write heads 134. Generally, the one or more read/write heads 134 are mounted to a rotary actuator assembly to which a coil 132 of a voice coil motor (VCM) is attached. As is known in the art, a VCM includes a pair of magnetic flux paths between which the coil 132 is disposed so that the passage of current through the coil causes magnetic interaction between the coil 132 and the magnetic flux paths, resulting in the controlled rotation of the actuator assembly and the movement of the one or more heads 134 relative to the surfaces of the one or more discs 136. The servo circuit 118 is used to control the application of current to the coil 132, and hence the position of the heads 134 with respect to the tracks.

The control circuitry 106 further includes a spindle circuit 120 that is coupled to a spindle motor 138 to control the rotation of the one or more discs 136. The control circuitry 106 further includes programming and parameter values stored at a dynamic random access memory (DRAM) 122, a non-volatile flash memory 124, other memory 126, or any combination thereof. In a particular embodiment, the programmable precoder 116 may execute instructions retrieved from one of the non-volatile flash memory 124 or the other memory 126. In another particular embodiment, the programmable precoder 116 may access a programmable look-up table (LUT) that is stored at one of the non-volatile flash memory 124 or the other memory 126.

Figure 3:
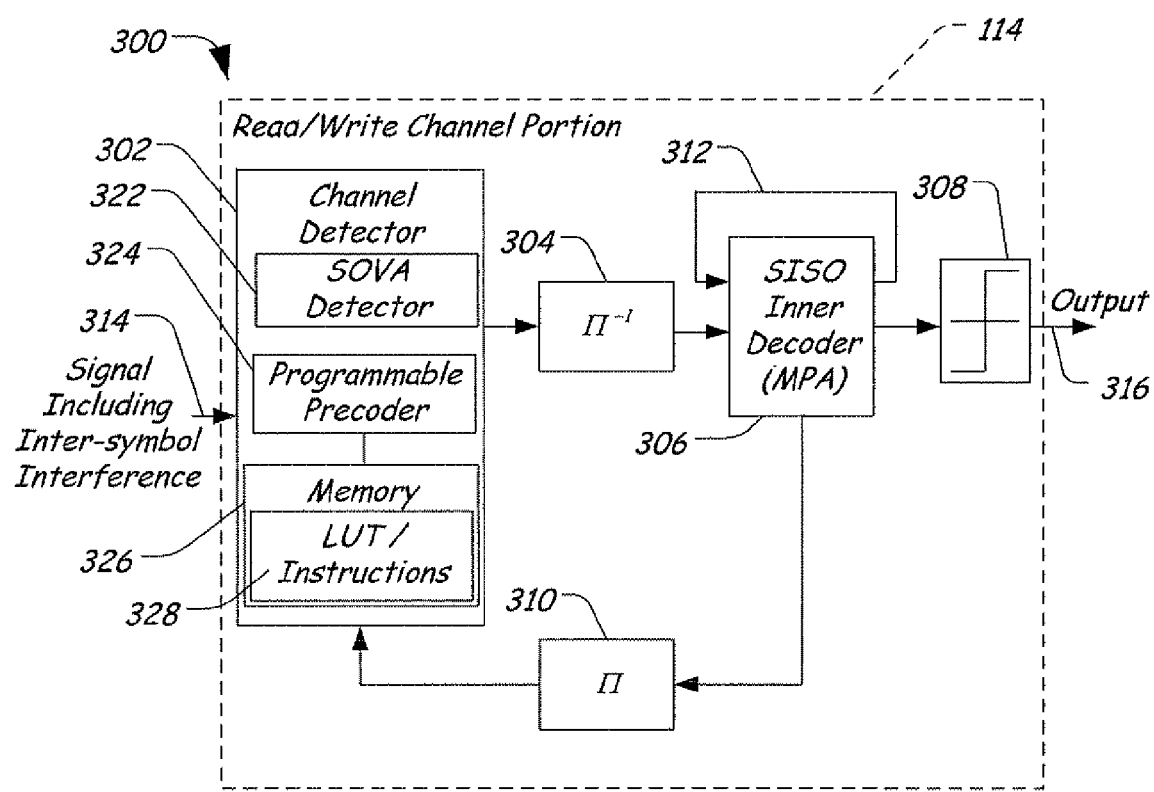
FIG. 3 is a block diagram of a system including a portion of a read/write channel, such as the read/write channel of FIG. 1, having a channel detector that includes a programmable precoder.

In a particular example, the read/write channel 114 includes a programmable precoder 116 that is adapted to utilize a look-up table stored at the flash memory 124, at the other memory 126, or at a memory within the read/write channel 114, such as a memory 326 illustrated in FIG. 3. The programmable precoder 116 is adapted to map user bits to channel bits using the look-up table. In a particular embodiment, the read/write channel 114 may also include a soft-output detector, such as a soft-output Viterbi algorithm (SOVA) detector that is adapted to calculate reliabilities of user bits and/or channel bits related to each other by the programmable precoder 116.

Figure 2:
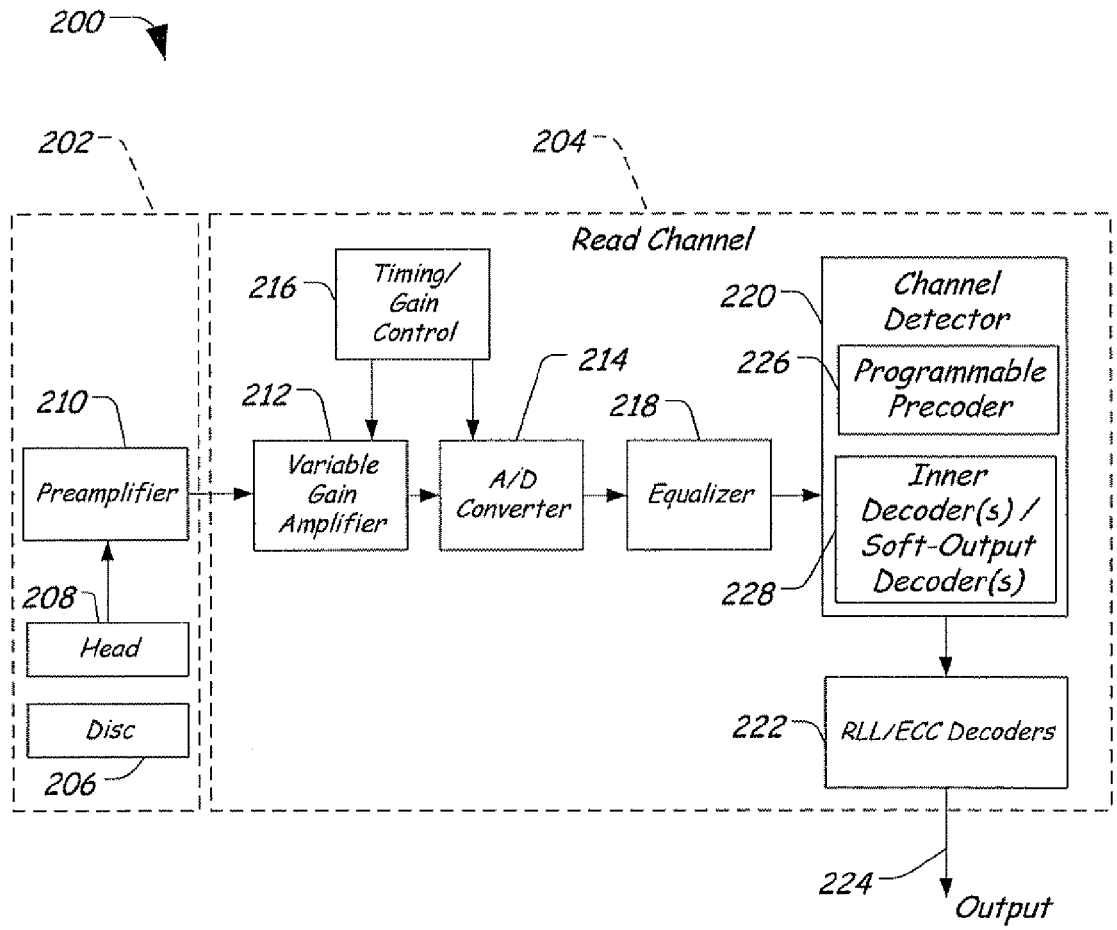
FIG. 2 is a block diagram of a particular illustrative embodiment of a system including a read channel having a programmable precoder.

FIG. 2 is a block diagram of a particular illustrative embodiment of a system 200 including a read channel 204 having a programmable precoder 226. The read channel 204 is coupled to a head-disc assembly 202, which includes a storage medium, such as a magnetic disc 206. The head-disc assembly 202 further includes a read/write head 208 that is movable relative to the magnetic disc 206 to read and write data from and to the magnetic disc 206. The read/write head 208 is coupled to a preamplifier 210, which is adapted to amplify a readback signal received from the read/write head 208 and to provide the readback signal to the read channel 204. In a particular embodiment, the readback signal includes correlated noise, such as inter-symbol interference.

The read channel 204 includes a variable gain amplifier 212 that is coupled to the preamplifier 210 to receive the readback signal. The variable gain amplifier 212 provides the readback signal to an analog-to-digital (A/D) converter 214, which samples (digitizes) the readback signal. A timing/gain control circuit 216 is coupled to the variable gain amplifier 212 and to the A/D converter 214 to control the gain of the variable gain amplifier 212 and a sample rate of the A/D converter 214. The output of the A/D converter 214 is provided to an equalizer 218, which is adapted to perform time-domain equalization to filter the digitized readback signal to a pre-selected partial response, maximum likelihood detection (PRML) target waveform, for example. The output of the equalizer 218 is provided to a channel detector 220, which convert the readback signal to user bits and provides the recovered user bits to a run-length limited (RLL) and/or error correction code (ECC) decoder 222, which provides corrected user bit data at an output 224. The output may be coupled to a host system via an interface, such as the interface 110 illustrated in FIG. 1.

The channel detector 220 includes a programmable precoder 226 to map channel bits to user bits and vice versa. In a particular embodiment, the programmable precoder 226 may be a look-up table that defines a bi-directional mapping between channel bits and user bits. In another particular embodiment, the programmable precoder 226 may be a processor adapted to execute instructions that control the programmable precoder 226 to map user bits to channel bits and vice versa. In another particular example, the programmable precoder 226 can be implemented as a logic circuit with one or more selectable gates or switches that can be selectively activated to program the precoder 226. In this particular instance, the logic circuit can be implemented without a microprocessor or a look-up table.

The channel detector 220 further includes one or more inner decoders and/or soft-output decoders 228 that receive the permuted coded user bits and their reliabilities from the SOVA detector 322, which uses the mapping information from the programmable precoder 226 (such as a look-up table). In a particular example, the inner decoders/soft-output decoders 228 are adapted to calculate a priori reliabilities of the user bits and to supply the a priori reliabilities back to the SOVA detector 322. In a particular embodiment, the inner decoders/soft-output decoders 228 include a soft-output Viterbi algorithm (SOVA) decoder.

FIG. 3 is a block diagram of a system 300 including a portion of a read/write channel, such as the read/write channel 114 of FIG. 1, having a channel detector 302 that includes a programmable precoder 324. The channel detector 302 includes an input 314 to receive a signal including correlated noise, such as inter-symbol interference (ISI) from a signal source, such as a receiver circuit, a storage media, another source, or any combination thereof. In a particular example, the received signal at the input 314 is a readback signal. The channel detector 302 provides estimates of coded user bits and their reliabilities to a de-interleaver 304, which provides a de-interleaved version of the coded user bits to a soft-input soft-output (SISO) inner decoder 306, which is adapted to iteratively decode the signal and return decoded user bits via a feedback loop 312. The SISO inner decoder 306 provides the decoded data to the channel detector 302 via an interleaver 310. In a particular embodiment, the SISO inner decoder 306 is adapted to utilize a message-passing algorithm (MPA) to decode the signal. Upon completion of the decoding iterations, the SISO inner decoder 306 also provides decoded data to an output 316 via a threshold filter 308.

The channel detector 302 includes a soft-output Viterbi algorithm (SOVA) detector 322. The channel detector 302 further includes a programmable precoder 324 and a memory 326 that is accessible to the programmable precoder 324. The memory 326 is adapted to store a look-up table (LUT), precoder instructions, or any combination thereof (generally designated as LUT/Instructions 328). In a particular example, the programmable precoder 324 includes logic adapted to use the look-up table to map channel bits from a received signal to user bits and vice versa. In another particular example, the programmable precoder 324 includes a processor and the LUT/Instructions 328 include instructions executable by the processor to receive a signal and to map channel bits of the received signal to user bits and vice versa. The SOVA detector 322 is adapted to receive mapped user bits from the programmable precoder 324 and to decode the received signal using the mapped user bits using the LUT/instructions 328. In a particular example, the SOVA detector 322 is adapted to calculate reliabilities related to the user bits based on the received signal and to update reliabilities associated with the mapped user bits based on the calculated reliabilities.

In a particular embodiment, the channel detector 302 receives a signal including correlated noise at the input 314. In a particular example, the correlated noise is inter-symbol interference (ISI), which is a form of distortion of a signal in which one symbol within a signal interferes with subsequent symbols (i.e., neighboring symbols). In general, ISI has a similar effect as noise, making readback data less reliable. The channel detector 302 uses the programmable precoder 324 to reduce a raw bit error rate of the channel by reducing the number of errors (frequency of errors) associated with typical error events. In a particular example, the programmable precoder 324 is adapted to map user bits from the received signal to channel bits using the LUT/instructions 328. The channel bits and user bits are provided to the SOVA decoder 322 and the SOVA decoder 322 makes hard bit decisions related to the mapped user bits and provides bit-level reliability data (such as log-likelihood ratios, LLRs). The SOVA decoder 322 is adapted to compute reliabilities associated with the mapped bits from the programmable precoder 324.

The channel detector 302 provides the mapped user bits and the LLRs to the SISO inner decoder 306 via the de-interleaver 304. The SISO inner decoder 306 uses an iterative message-passing algorithm (MPA) to decode the mapped user bits and the LLRs and to calculate hard bit decisions and reliability data. The SISO inner decoder 306 provides the hard bit decisions and the reliability data to the output 316 via the threshold filter 308 and provides the hard bit decisions to the channel detector 302 via the interleaver 310.

In a particular example, the LUT/instructions 328 may include multiple look-up tables (LUTs), which may include data related to particular operating conditions associated with an electronic device. For example, the LUT/instructions 328 may include selection logic to allow the programmable precoder 324 to select a particular LUT of a plurality of programmable LUTs stored at the memory 326 based on one or more operating conditions of the electronic device. For example, the channel characteristics of a magnetic recording system, such as a disc drive, can be dependent on the radial distance of the data track from the center of a rotating disc, such as the one or more discs 136 illustrated in FIG. 1. In a particular example, the programmable precoder 324 may include logic that is adapted to select a look-up table (LUT)/instructions 328 from a plurality of LUTs stored at the memory 326 based on a radial distance of the data track from the center of the disc. By selecting a desired LUT based on the operating condition, the programmable precoder 324 can use operating conditions to tune its own performance. Moreover, in a particular example, the radial distance could be used to adaptively program the LUT/instructions 328 for use with the programmable precoder 324 and the SOVA detector 322 of the channel detector 302. In a particular example, each read/write head of a multi-platter disc drive may have an associated look-up table, and the programmable precoder 324 may map user bits to channel bits and vice versa using the selected LUT/instructions 328 set from the memory 326 that is particular to the read/write head.

In a particular embodiment, the SOVA detector 322 uses a technique that is modified to compute reliabilities (soft decisions) associated with user bits directly, avoiding recalculation of the reliabilities of the user bits from the channel bits. Conventionally, a SOVA algorithm may be summarized as follows: when two paths merge at any state during the course of the Viterbi decoding, the difference between the cumulative path-metrics between the survivor path and the non-survivor path determines reliabilities of channel bits associated with previous hard decisions. At the SOVA detector 322, when two paths merge at any state of a trellis, the SOVA detector 322 updates the reliabilities of the user bits (rather than the channel bits) based on a path metric difference. The channel detector 202 with the programmable precoder 324 and the SOVA decoder 322 using the modified SOVA technique (described in detail below) provide an enhanced data detection, which can reduce bit rate errors in channels with correlated noise.

In a particular embodiment, the programmable precoder 324 is a non-polynomial precoder, which can be represented in terms of a look-up table. The programmable precoder 324 can map a group of L user bits to a corresponding group of L channel bits (and vice versa), depending on the previous M bits in the channel state. In a particular example, the mapping defined by the LUT/instructions 328 is invertible conditioned on the original state of a branch in the trellis. In this example, the programmable precoder 324 may be described by a look-up table (LUT) consisting of $2^{M+L}$ rows, where L represents a length (i.e., a number of bits to be mapped) and M represents a memory (i.e., a number of recent state bits). The programmable precoder 324 that is defined by such a LUT can be referred to as a sectional precoder of memory (M) and length (L). An example of a precoder defined by a look-up table (LUT) of memory (M=1) and length (L=2) is illustrated below in TABLE 1.

TABLE 1

Mapping for an example precoder having a memory (M = 1) and length (L = 2).

| State bit ($x_{2n-1}$) | Channel bits ($x_{2n}, x_{2n+1}$) | User bits ($a_{2n}, a_{2n+1}$) |
|---|---|---|
| 0 | 00 | 00 |
| 0 | 01 | 01 |
| 0 | 10 | 11 |
| 0 | 11 | 10 |
| 1 | 00 | 01 |
| 1 | 01 | 11 |
| 1 | 10 | 10 |
| 1 | 11 | 00 |

The mapping illustrated in TABLE 1 describes a non-polynomial, inverse precoder (postcoder) because the mapping defines a mapping from the channel bits to the user bits. However, this particular form facilitates its integration with the SOVA detector 322.

While polynomial precoders are known and are simple to implement, the the programmable precoder 324 utilizes a non-polynomial mapping that can outperform polynomial precoders by reducing a bit error rate (BER) for user bits. The non-polynomial, programmable precoder 324 can be defined by a small programmable look-up table, such TABLE 1, which may be stored at the memory 326 as illustrated by LUT/instructions 328. In a particular example, the SOVA detector 322 computes the reliabilities of the user bits using the programmable look-up table (i.e., LUT/instructions 328) for the precoder mapping. It should be understood that additional columns may be added that relate to operating conditions to allow the programmable precoder 324 to select a particular set of rows within the table based on a correspondence to a particular operating condition.

In a particular example, a sectional (programmable) non-polynomial precoder is applied to magnetic recording channels. In this example, the magnetic recording channels include a perpendicular recording channel. The channel detector 200 uses a soft-output Viterbi algorithm (SOVA) detector that is optimized for the channel based on data-dependent noise-prediction (DDNP).

In a particular example, testing reveals that a programmable precoder 222 with a memory (M=1) and a length (L=3) can be used in connection with the SOVA detector for signals at 60% and 90% jitter and for signal-to-noise ratios (SNRs) in the range from 20 dB to 24 dB. A precoder mapping table with a memory of 1 and a length of 3 for a magnetic recording channel at 60% jitter is illustrated in Table 2 below.

TABLE 2

Mapping for an example precoder (M = 1, L = 3) at 60% jitter

| State bit ($x_{3n-1}$) | Channel bits ($x_{3n}$, $x_{3n+1}$, $x_{3n+2}$) | User bits ($a_{3n}$, $a_{3n+1}$, $a_{3n+2}$) |
|---|---|---|
| 0 or 1 | 000 | 000 |
| 0 or 1 | 001 | 001 |
| 0 or 1 | 010 | 100 |
| 0 or 1 | 011 | 010 |
| 0 or 1 | 100 | 111 |
| 0 or 1 | 101 | 011 |
| 0 or 1 | 110 | 110 |
| 0 or 1 | 111 | 101 |

A precoder mapping table with a memory of 1 and a length of 3 for a magnetic recording channel at 90% jitter is illustrated in Table 3 below.

TABLE 3

Mapping for an example precoder (M = 1, L = 3) at 90% jitter.

| State bit ($x_{3n-1}$) | Channel bits ($x_{3n}$, $x_{3n+1}$, $x_{3n+2}$) | User bits ($a_{3n}$, $a_{3n+1}$, $a_{3n+2}$) |
|---|---|---|
| 0 or 1 | 000 | 000 |
| 0 or 1 | 001 | 001 |
| 0 or 1 | 010 | 100 |
| 0 or 1 | 011 | 101 |
| 0 or 1 | 100 | 111 |
| 0 or 1 | 101 | 011 |
| 0 or 1 | 110 | 110 |
| 0 or 1 | 111 | 010 |

In a particular example, at length (L=3), a desired mapping for a programmable precoder 324, such as the precoders illustrated by the look-up tables illustrated in TABLES 2 and 3 may be memoryless (i.e., M=0), which simplifies the look-up tables. In another particular example, the programmable precoders 222 illustrated by the mappings of TABLES 2 and 3 are not equivalent to any polynomial precoder and provide up to approximately 0.15 dB gain in system performance compared to conventional polynomial precoders for magnetic recording channels.

In another particular example, the programmable precoder 324 can be implemented as a sectional precoder with a memory (M=0) and a length (L=4). For clarity, the following discussion is restricted to the programmable precoders that are memoryless, which reduces complexity and renders the implementation tractable. A mapping from channel bits to user bits for a memoryless, programmable precoder is illustrated in TABLES 4 and 5 below for magnetic recording channels having jitter at 60% and 90%, respectively.

TABLE 4

Mapping for an example precoder (M = 0, L = 4) at 60% jitter.

| Channel bits ($x_{4n}$, $x_{4n+1}$, $x_{4n+2}$, $x_{4n+3}$) | User bits ($a_{4n}$, $a_{4n+1}$, $a_{4n+2}$, $a_{4n+3}$) |
|---|---|
| 0000 | 0000 |
| 0001 | 0001 |
| 0010 | 0011 |
| 0011 | 0010 |
| 0100 | 1011 |
| 0101 | 0111 |
| 0110 | 1101 |

TABLE 4-continued

Mapping for an example precoder (M = 0, L = 4) at 60% jitter.

| Channel bits ($x_{4n}$, $x_{4n+1}$, $x_{4n+2}$, $x_{4n+3}$) | User bits ($a_{4n}$, $a_{4n+1}$, $a_{4n+2}$, $a_{4n+3}$) |
|---|---|
| 0111 | 0100 |
| 1000 | 1001 |
| 1001 | 0101 |
| 1010 | 1111 |
| 1011 | 0110 |
| 1100 | 1010 |
| 1101 | 1110 |
| 1110 | 1100 |
| 1111 | 1000 |

TABLE 5

Mapping for an example precoder (M = 0, L = 4) at 90% jitter.

| Channel bits ($x_{4n}$, $x_{4n+1}$, $x_{4n+2}$, $x_{4n+3}$) | User bits ($a_{4n}$, $a_{4n+1}$, $a_{4n+2}$, $a_{4n+3}$) |
|---|---|
| 0000 | 0000 |
| 0001 | 0001 |
| 0010 | 0111 |
| 0011 | 0101 |
| 0100 | 0010 |
| 0101 | 0011 |
| 0110 | 0110 |
| 0111 | 0100 |
| 1000 | 1000 |
| 1001 | 1001 |
| 1010 | 1111 |
| 1011 | 1101 |
| 1100 | 1010 |
| 1101 | 1011 |
| 1110 | 1110 |
| 1111 | 1100 |

It should be understood that a typically segment of the trellis consists of $2^\mu$ states at a time (n) where $\mu$ represents the channel memory connected to $2^\mu$ states at time n+1, and two branches leaving/entering each state correspond to a value of an incoming channel bit. Typically, computations for Viterbi and SOVA algorithms take place at the baud rate. However, it is sometimes advantageous from a design perspective to run the Viterbi and SOVA algorithms on the trellis at a slower rate for an increased computational complexity per clock cycle. To run a trellis clock at $1/\lambda$ of the baud rate, the trellis can be implemented in terms of its radix-$2^\lambda$ form, where we combine $\lambda$ segments of the original trellis into a single segment. In a radix-$2^\lambda$ implementation, there are $2^\lambda$ branches leaving/entering each state (corresponding to $\lambda$ bits per state transition). As far as hard and soft outputs are concerned, both implementations are equivalent.

In general, the SOVA decoder 322 can be used in conjunction with an arbitrary programmable precoder 324 specified by the LUT/instructions 328. In a particular example, the programmable precoder 324 may be programmed by updating the LUT/instructions 328. In a particular example, the programmable precoder 324 uses a mapping (LUT/instructions 328) having a section length (L) and memory (M) that is not more than a channel memory ($\lambda$), i.e., $M \leq \lambda$. In this example, it is convenient to view the SOVA detector in terms of a trellis of radix-$2^L$ form (L=$\lambda$) where both the precoder and the trellis operate on L-bit segments of bits.

More generally, the SOVA detector 322 can be implemented with an arbitrary programmable precoder 324 specified by the LUT/instructions 328 for an arbitrary choice of precoder section length (L) and number of bits per transition (λ) provided that the channel memory (μ) satisfies the condition $\mu \geq \mu_0 = M+L-\gcd(\lambda, L)$ where "gcd" denotes the greatest common divisor. In particular the SOVA can always be implemented for an unspecified λ if $\mu \geq \mu_0 = M+L-1$.

Some detector chips that are commercially available already implement a radix-16 Viterbi algorithm. In a particular embodiment, the non-polynomial, programmable precoder 324 has section length L=4 that can be integrated smoothly with the existing radix-16 implementations of the Viterbi detector. In a particular example, a programmable memoryless precoder 324 (with M=0) admits a simple precoder implementation, where L user bits are mapped to L channel bits regardless of the state variable.

Figure 4:
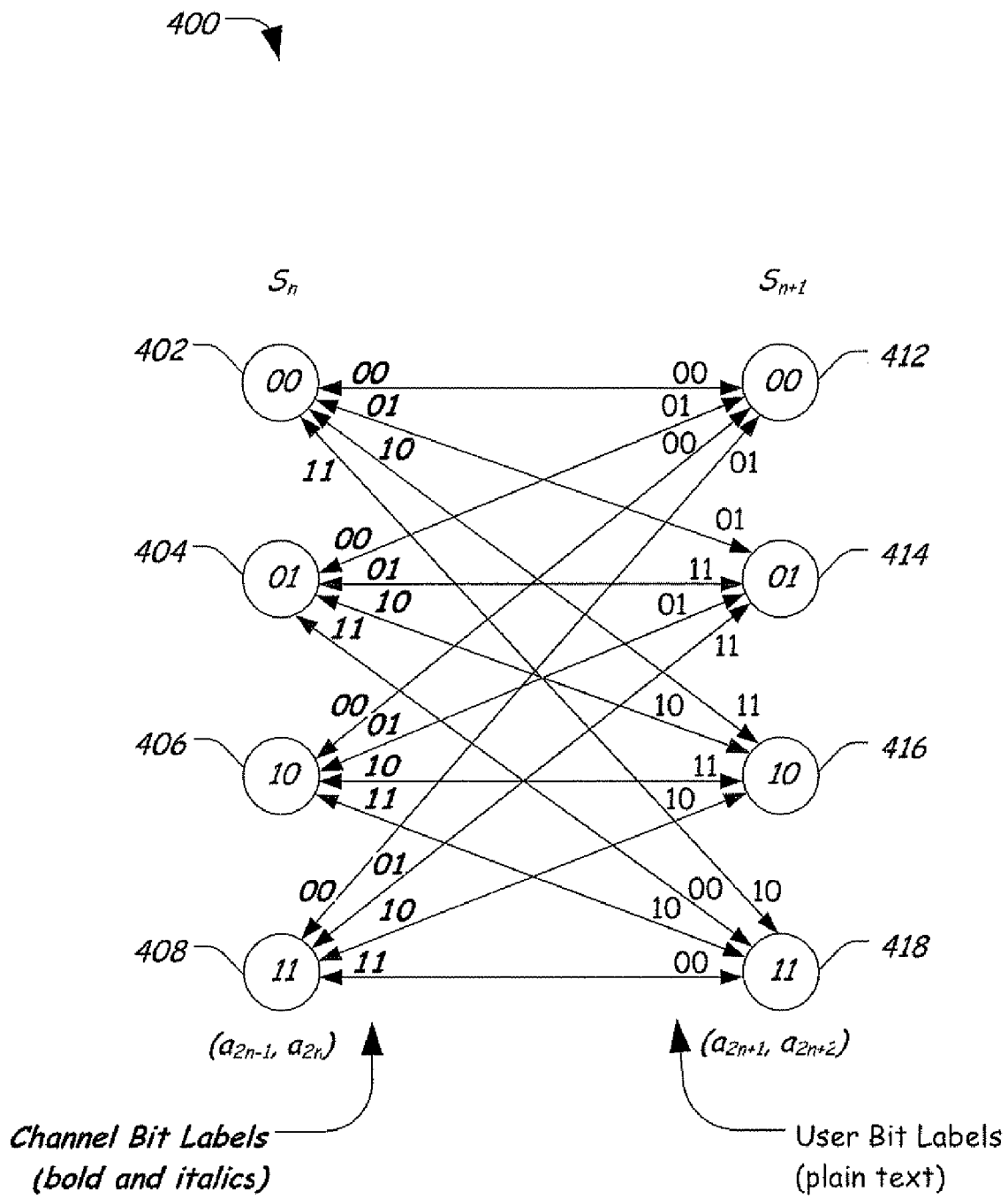
FIG. 4 is a diagram of a particular illustrative embodiment of a portion of a radix-4 trellis illustrating a mapping of user bits to channel bits.

FIG. 4 is a diagram of a particular illustrative embodiment of a segment of a radix-4 trellis 400 illustrating a mapping of L=2 user bits to 2 channel bits. The radix-4 trellis 400 has $2^L=4$ branches leaving/entering any state in the trellis, where there are two 2-bit labels on every branch in the trellis: the incoming channel bits and the user bits. In the radix-4 trellis segment 400 shown, the branches are labeled according to the programmable precoder described by TABLE 1. The radix-4 trellis 400 includes user bit labels (generally indicated in plain text) that can be found using the programmable lookup table given the (M) state variable bits and the channel bit label (generally indicated in bold and italics). The (M) newest bits of the state variable and the (L) incoming channel bits uniquely determine the respective (L) user bits corresponding to any branch in the trellis.

The radix-4 trellis 400 includes four possible state values 402, 404, 406, and 408 at a first bit state ($S_n$) and four possible state values 412, 414, 416, and 418 at a second bit state ($S_{n+1}$). In general, a branch computation metric uses the state and channel bit labels (such as 00, 01, 10, and 11, illustrated in bold and italics for channel bits and in plain text for user bits) as usual. However, the SOVA detector, such as the SOVA detector 322 illustrated in FIG. 3, operates using the user bit labels assigned to each branch. In other words, when multiple paths merge at a state, the SOVA detector computes metric differences, traces the multiple paths back to compare the user bits rather than the channel bits on all of the paths to assign/update reliabilities to the user bits. The branch metric computation uses the state and channel bit label as usual.

A summary of the implementation details of the log-likelihood ratio (LLR) computation for the user bits is provided below. In a particular example, a conventional SOVA algorithm can be superimposed on a radix-$2^L$ trellis.

In this example, the signed LLR of a bit $a_m$ can be defined as follows:

$$L_m = \log \frac{P(a_m = 0)}{P(a_m = 1)} \quad \text{(Equation 1)}$$

Suppose that a cumulative metric of the i-th path ending at a state $S_n$ at time (n) is $\mu_i(S_n)$. At any stage during the decoding, let the hard decisions and the associated log-likelihood ratios (LLRs) on the i-th path be defined as $\hat{a}_m^i(S_n)$ and $L_m^i(S_n)$, respectively, for $m \leq nL+L-1$. The hard decisions are obtained by simply tracing the path back through the trellis and recording the (plain text) user bit labels for every branch. The user bit labels themselves can be found readily using the programmable postcoder lookup table. Metric differences between the i-th path and the survivor path can be calculated as follows:

$$\Delta_i(S_n) = \mu_i(S) - \min_i \mu_i(S_n) \quad \text{(Equation 2)}$$

Let i* denote the surviving path. Thus, the new hard decisions are represented as $\hat{a}_m^{i*}(S_n)$ and their associated log-likelihood ratios (LLRs) can be updated as follows. In a particular example, all paths merge at a state ($S_n$). Infinite reliabilities are assigned to those (newest) bits $\{a_m: nL \leq m < nL+L\}$ for which LLRs have not yet been assigned. The LLRs of the bits (new and old) $\{a_m : m<nL+L\}$ are updated as follows (with the definitions $\sigma(0)=1$ and $\sigma(1)=-1$):

$$L_m(S_n) \leftarrow \sigma(\hat{a}_m^{i*}) \min_i \Lambda_m^i(S_n) \quad \text{(Equation 3)}$$

$$\Lambda_m^i(S_n) = \begin{cases} \Delta_i(S_n) & \text{if } \hat{a}_m^i \neq \hat{a}_m^{i*} \\ |L_m^i(S_n)| + \Delta_i(S_n) & \text{if } \hat{a}_m^i = \hat{a}_m^{i*} \end{cases} \quad \text{(Equation 4)}$$

Equations 3 and 4 above perform max-log maximum a posteriori (MAP) decoding.

In a particular example, the SOVA algorithm may be superimposed on a radix-$2^\lambda$ trellis for an arbitrary λ different from L provided that the channel memory satisfies $\mu \geq \mu_0 = M+L-\gcd(\lambda, L)$. The LLR updates (Equations 3 and 4) need to be performed only on successfully decoded L-bit blocks of user bits. The LLR updates for incomplete blocks are postponed to a future trellis state when the complete L-bit block is received.

In a particular example, consider an inter-symbol interference channel described by the following equation:

$$y_n = 3x_n + 2x_{n-1} + x_{n-2} + w_n \quad \text{(Equation 5)}$$

where $x_n \in \{0,1\}$ and $y_n$ are the channel input and output bits, respectively, and where $w_n$ is additive zero-mean white Gaussian noise with variance $\sigma_w^2 = 1$. Furthermore, using a programmable precoder having a memory and a length (M=1, L=2) specified by TABLE 1 to map the user bits to channel bits.

Referring again to the radix-4 trellis 400 illustrated in FIG. 4, a branch metric for the transition from a state $(S_{n-1})=(x_{2n-2}, x_{2n-1})$ to a state $(S_n)=(x_{2n}, x_{2n+1})$ can be calculated as follows:

$$\gamma(S_{n-1}, S_n) = \frac{1}{2}(|y_{2n} - 3x_{2n} - 2x_{2n-1} - x_{2n-2}|^2 + |y_{2n+1} - 3x_{2n+1} - 2x_{2n} - x_{2n-1}|^2) \quad \text{(Equation 6)}$$

Figure 5:
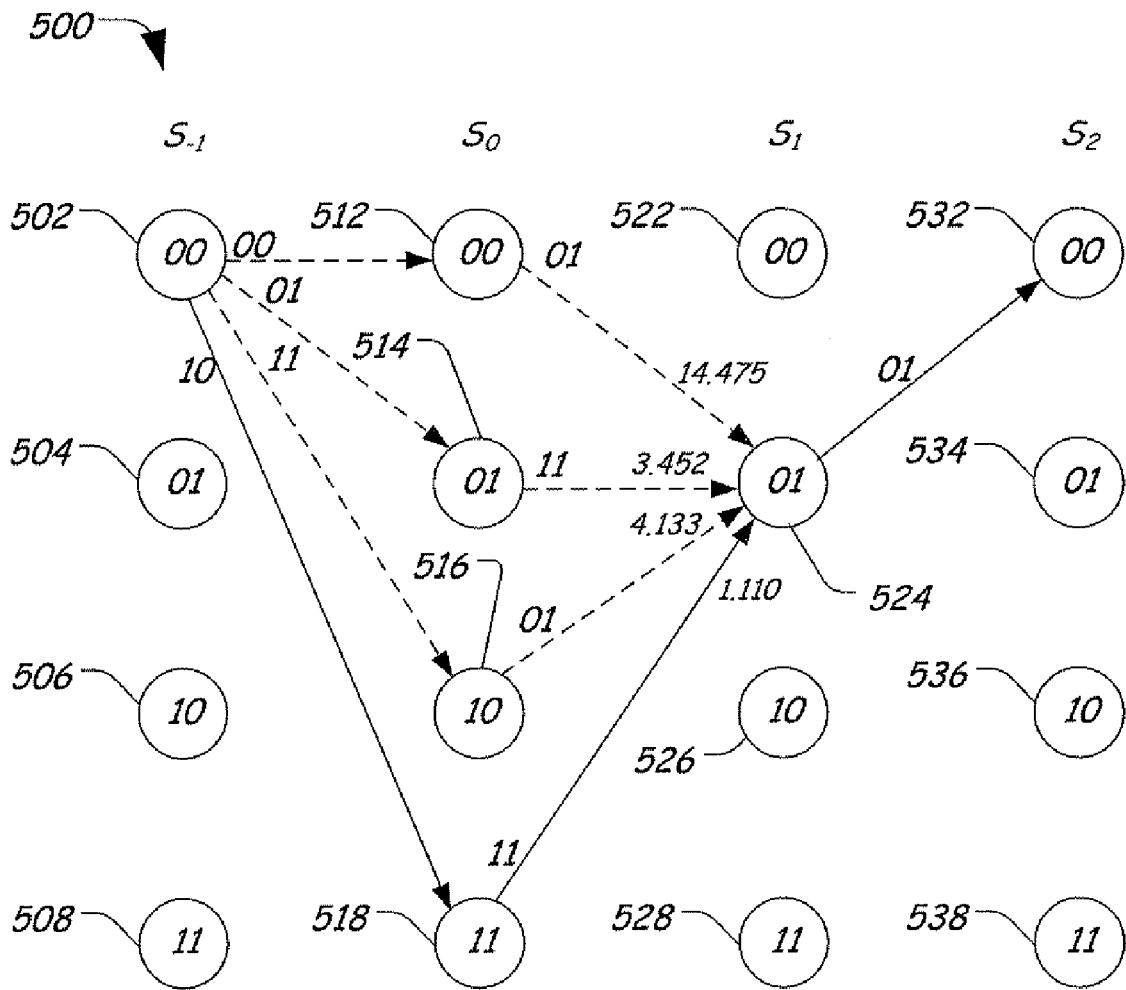
FIG. 5 is a diagram of another particular illustrative embodiment of a portion of a radix-4 trellis illustrating four state paths merging at a state ($S_1$=01)

Referring now to FIG. 5, a diagram of another particular illustrative embodiment of a portion of a radix-4 trellis 500 illustrating four state paths merging at a state ($S_1=01$) is shown. The trellis 500 includes four bit-state values 00, 01, 10, and 11 at first, second, third, and fourth states ($S_{-1}, S_0, S_1$, and $S_2$). At the first state ($S_{-1}$), the trellis 500 includes a first bit-state value (00) 502, a second bit-state value (01) 504, a third bit-state value (10) 506, and a fourth bit-state value (11) 508. At the second state ($S_0$), the trellis 500 includes a first bit-state value (00) 512, a second bit-state value (01) 514, a third bit-state value (10) 516, and a fourth bit-state value (11) 518. At the third state ($S_1$), the trellis 500 includes a first bit-state value (00) 522, a second bit-state value (01) 524, a third bit-state value (10) 526, and a fourth bit-state value (11)

528. At the fourth state ($S_2$), the trellis 500 includes a first bit-state value (00) 532, a second bit-state value (01) 534, a third bit-state value (10) 536, and a fourth bit-state value (11) 538.

In a particular example, a user bit input sequence begins with the six bits a={1, 0, 1, 1, 0, 1, ...}. Assuming that $x_n=0$ for n<0, the initial state of the radix-4 trellis 500 is indicated at a first state ($S_{-1}$) is at a first bit-state value (00) 502. The programmable precoder maps this state value to the channel bit input sequence x={1, 1, 0, 1, 0, 0, ...}. Thus, a noise-free output is given by $y^0$={3, 5, 3, 4, 2, 1, ...} and a typical noisy received sequence {$y_n$:n≧0} is as y={2.1413, 4.4864, 1.9450, 3.6733, 1.3757, 1.6729, ...}.

Tracing through the steps of the programmable SOVA algorithm with the above-received noise sequence (y), an initial state metric of 0 can be assigned to the first state ($S_{-1}$), such that the selected bit-state at the first state ($S_{-1}$) is the first bit-state value (00) 502. An infinite metric is assigned to all of the second, third, and fourth bit-state values (01, 10, and 11) 504, 506, and 508 of the first state ($S_{-1}$). Using the Viterbi algorithm, it can be verified that at time n=2, the first bit-state value (00) 532 at the fourth state ($S_2$) has a lowest state metric of 1.5317 and the Viterbi path that ends on the fourth state ($S_2$) is $\hat{x}$={1, 0, 1, 1, 0, 1}. In this example, the six decisions are error free. The user bit decisions are obtained by applying the postcoder map (illustrated in TABLE 1) to the channel bit decisions â={1, 0, 1, 1, 0, 1}. The channel bit decisions are readily determined using the postcoder look-up table. The postcoder map is an inverse of a precoder map defined in a precoder look-up table.

Referring again to FIG. 5, the operation of the SOVA algorithm can be explained with respect to the trellis 500. Since all paths start at $S_{-1}$=00, i.e., at a first bit-state value (00) 502, there are no merging paths at any of the first, second, third, and fourth bit-state values 512, 514, 516, and 518 at the second state ($S_0$) at time (0). Thus, the temporary bit decisions at the first, second, third, and fourth bit-state values 512, 514, 516, and 518 at the second state ($S_0$) are assigned infinite reliabilities at time 0. At the third state ($S_1$) at the time n=1, reliabilities can be calculated for each of the first, second, third, and fourth bit-value states 522, 524, 526, and 528, respectively. For a moment, consider only bit paths that merge at the second bit-state value (01) 524. The Viterbi path is illustrated as a solid line converging from the bit-state value (11) 518 at the second state ($S_0$). The user bit labels corresponding to each of the branches are shown. The user bit labels can be obtained from the programmable look-up table based on the incoming channel bits and a newest bit of origin state. Observe that the user bit labels on all incoming branches at the second bit-state value (01) 524 can be different, unlike the channel bit labels, which are the same on all incoming branches.

The cumulative branch metrics (14.475, 3.452, 4.133, and 1.110) are also indicated on the last branch of each path merging at the bit-value state ($S_1$=01) 524. TABLE 6 illustrates the four merging paths in a decreasing order of likelihood and the path metric difference (Δ) relative to the survivor path.

TABLE 6

| Path ($P_i$) | User bits ($a_0, \ldots, a_3$) | Path metric ($\mu_i$) | $\Delta_i = \mu_i - \min_j \mu_j$ |
|---|---|---|---|
| $P_1$ | 1011 | 1.110 | 0 |
| $P_2$ | 0111 | 3.452 | 2.342 |
| $P_3$ | 1101 | 4.133 | 3.023 |
| $P_4$ | 0001 | 14.475 | 13.365 |

In TABLE 6, the Path ($P_1$) is the most likely path (survivor) with hard decisions ($a_0, a_1, a_2, a_3$)=(1, 0, 1, 1). The most likely path for which $a_0$ has a different decision is $P_2$. For $a_1$ and $a_2$, those paths are $P_2$ and $P_3$, respectively. In this particular example, all four paths ($P_1$, $P_2$, $P_3$, and $P_4$) have the same decision for $a_3$, rendering the hard decision on the $a_3$ bit completely reliable (with infinite LLR).

Therefore, the log-likelihood ratios (LLRs) for these decisions can be assigned as follows: $L_0(S_1)=L_1(S_1)=\Delta_2=2.342$, $L_2(S_1)=\Delta_3=3.023$, and $L_3(S_1)=\infty$. It should be noted that these are user bit log-likelihood ratios (LLRs) conditioned on ending at the first bit-value state ($S_1$=01) 524.

If a similar process is performed for the bit state (S1 ∈ {00, 10, 11}) 522, 526, and 528, respectively, the signed LLRs can be obtained as follows:

$$L_m^i(S_1) = \log\left(\frac{P(a_m = 0)}{P(a_m = 1)}\right) \quad \text{(Equation 7)}$$

for the i-th path merging at the bit state ($S_2$). The signed LLRs obtained from Equation 7 as it relates to the first, second, third, and fourth bit-state values (00, 01, 10, 11) 522, 524, 526, and 528 at the third bit state ($S_1$) is shown in TABLE 7.

TABLE 7

| $S_1$ | $a_0$ | $a_1$ | $a_2$ | $a_3$ |
|---|---|---|---|---|
| 00 | −2.342 | 2.342 | ∞ | −6.022 |
| 01 | −2.342 | 2.342 | −3.023 | −∞ |
| 10 | −1.319 | −1.978 | −∞ | −1.319 |
| 11 | −4.319 | −4.978 | −4.319 | ∞ |

Figure 6:
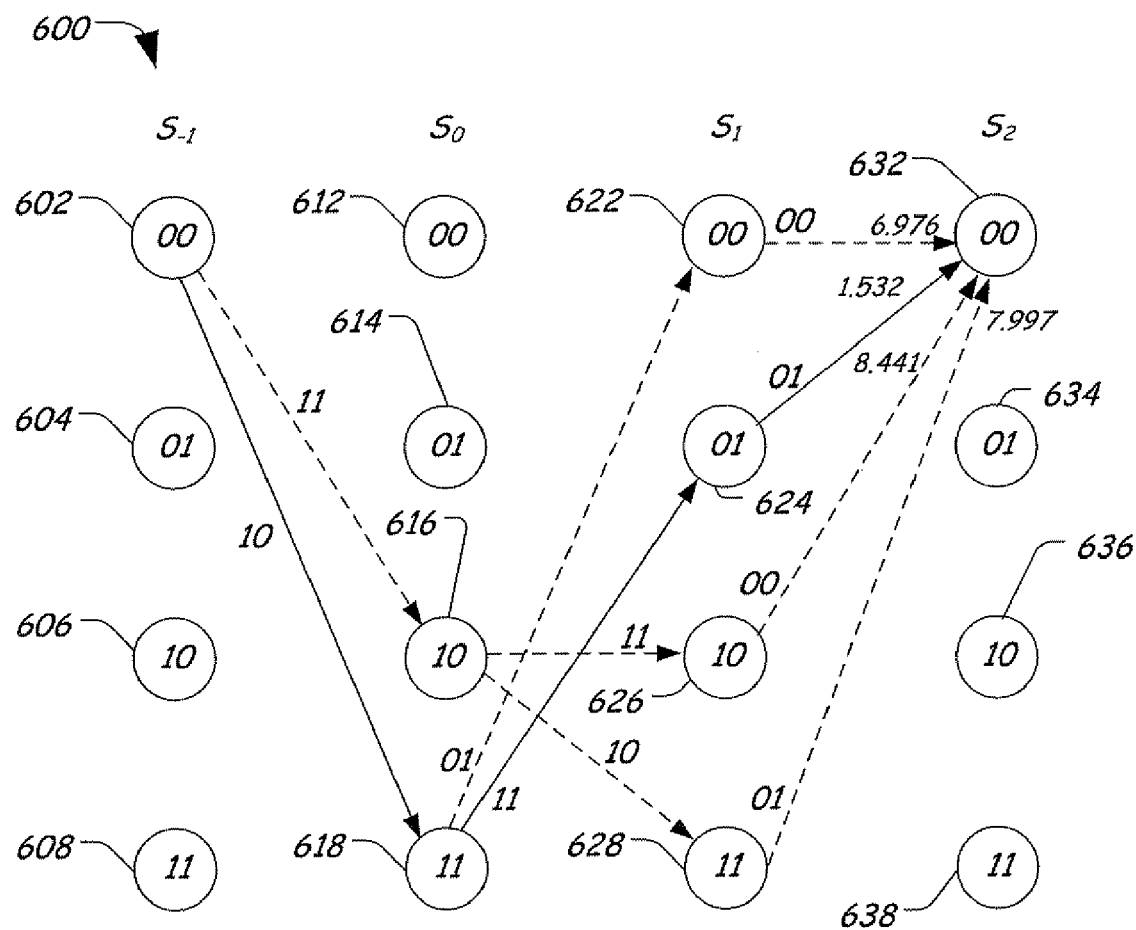
FIG. 6 is a diagram of still another particular illustrative embodiment of a portion of a radix 4-trellis illustrating four state paths merging at a state ($S_2$=00)

FIG. 6 is a diagram of still another particular illustrative embodiment of a radix 4-trellis 600 illustrating four state paths merging at a fourth bit state ($S_2$) having a bit-state value (00) 632. The trellis includes a first bit state ($S_{-1}$), a second bit state ($S_0$), a third bit state ($S_1$) and the fourth bit state ($S_2$). Each of the first, second, third and fourth bit states have four possible bit-state values. The first bit state ($S_{-1}$) includes a first bit-state value (00) 602, a second bit-state value (01) 604, a third bit-state value (10) 606, and a fourth bit-state value (11) 608. The second bit state ($S_0$) includes a first bit-state value (00) 612, a second bit-state value (01) 614, a third bit-state value (10) 616, and a fourth bit-state value (11) 618. The third bit state ($S_1$) includes a first bit-state value (00) 622, a second bit-state value (01) 624, a third bit-state value (10) 626, and a fourth bit-state value (11) 628. The fourth bit state ($S_2$) includes a first bit-state value (00) 632, a second bit-state value (01) 634, a third bit-state value (10) 636, and a fourth bit-state value (11) 638. In a particular example, the radix-4 trellis 600 illustrated in FIG. 6 corresponds to the radix-4 trellis 500 illustrated in FIG. 5, but the numbers are incremented to correspond to the figure number.

Consider the paths at the bit state (S2) that are merging to the bit-state value (00) 632 at time n=2. TABLE 8 illustrates temporary hard decisions in decreasing order of likelihood for the bit-state value (00) 632.

TABLE 8

| Path ($P_i$) | User bits ($a_0, \ldots, a_5$) | Path metric ($\mu_i$) | $\Delta_i = \mu_i - \min_j \mu_j$ |
|---|---|---|---|
| $P_1$ | 101101 | 1.532 | 0 |
| $P_2$ | 100100 | 6.976 | 5.444 |

TABLE 8-continued

| Path ($P_i$) | User bits ($a_0, \ldots, a_5$) | Path metric ($\mu_i$) | $\Delta_i = \mu_i - \min_i \mu_i$ |
|---|---|---|---|
| $P_3$ | 111001 | 7.997 | 6.465 |
| $P_4$ | 111100 | 8.441 | 6.909 |

The LLRs of the two newest bits ($a_4$ and $a_5$) are assigned based on the path metric difference ($\Delta$) values in TABLE 8. Specifically, the LLR for the bit ($a_4$) is represented as $L_4(S_2)=\infty$ and the LLR for the bit ($a_5$) is represented as $L_5(S_2)=5.444$. The LLRs of the previous bits ($a_0, \ldots, a_3$) are updated according to Equations 3 and 4, above. The LLRs of the bits ($a_0, \ldots, a_3$) conditioned on passing through the bit state ($S_2$) are as follows:

$$L_0(S_2) \leftarrow -\min\{2.342, 2.342+5.444, 4.319+6.465, 1.319+6.909\} = -2.342$$

$$L_1(S_2) \leftarrow -\min\{2.342, 2.342+5.444, 6.465, 6.909\} = 2.342$$

$$L_2(S_2) \leftarrow -\min\{3.023, 5.444, 4.319+6.465, \infty+6.909\} = -3.023$$

$$L_3(S_2) \leftarrow -\min\{\infty, 6.022+5.444, 6.465, 1.319+6.909\} = -6.465$$

Computing the log-likelihood ratios (LLRs) for other states $S2 \in \{01, 10, 11\}$, the algorithm continues for n>2. In particular, a path metric for a first path $P_1$ from the first bit-state value (00) 622 of the third state ($S_1$) to the first bit-state value (00) 632 of the fourth state ($S_2$) is 6.976. The path metric for a second path $P_2$ from the second bit-state value (01) 624 of the third state ($S_1$) to the first bit-state value (00) 632 of the fourth state ($S_2$) is 1.532. The path metric for a third path $P_3$ from the third bit-state value (10) 626 of the third state ($S_1$) to the first bit-state value (00) 632 of the fourth state ($S_2$) is 8.441. The path metric for a fourth path $P_4$ from the fourth bit-state value (11) 628 of the third state ($S_1$) to the first bit-state value (00) 632 of the fourth state ($S_2$) is 7.997. A path metric difference ($\Delta$) can be calculated to update the log-likelihood ratios (LLRs).

In general, preceding improves the performance of a communication system that has correlated channel bit errors, such as bit errors in a magnetic recording system, by lowering the raw bit error rate (BER) as seen by the error correction coding (ECC) and/or run-length limited (RLL) decoder. A programmable precoder can be represented by a look-up table to map user bits to channel bits and vice versa. In a particular example, the programmable precoder can be a polynomial or a non-polynomial precoder. While such preceding can be simple, the programmable precoder allows the read channel to be tuned or programmed for a particular channel. Further, postcoding at the decoder side can be performed jointly with the SOVA detector to enhance performance of the system.

In a particular example, sectional non-polynomial preceding represents a viable technique to improve system performance at a channel decoder. A sectional non-polynomial precoder can be efficiently stored in a programmable lookup table and can be used in connection with a soft-output Viterbi algorithm (SOVA) detector or other soft-output detectors to achieve significant gains relative to the best polynomial precoders for the magnetic recording channels. The sectional non-polynomial precoder can be used to de-correlate channel bit errors and improving overall performance. By integrating postcoding at the SOVA decoder, reliabilities may be computed directly for user bits, instead of sub-optimally post-processing channel bit reliabilities. In channels that have inter-symbol interference or other characteristics, direct computation of reliabilities for the user bits improves the performance of the decoder.

In a particular example, arbitrary precoders with a section length (L) can be integrated with a radix-$2^\lambda$ Viterbi trellis implementation. In a particular embodiment, the SOVA detector can be hardwired for a single precoder, such as 1/(1+D) polynomial precoder or for a specific mapping table. However, by allowing the precoder to be programmable, the programmable precoder can be tuned or adjusted for a particular channel, for particular operating conditions (such as a signal-to-noise ratio, transition noise levels, and/or other noise), or any combination thereof. The programmable precoder used in connection with a SOVA detector renders the SOVA detector programmable, allowing the channel detector to be readily adapted to different channels by simply optimizing the precoder mapping table.

In another particular example, during manufacturing, it is possible to specify a mapping table that is specific to a particular read/write head, a particular disc, a portion of a recording media, or any combination thereof. Furthermore, if the channel is known to have spatially-varying correlated noise, it is possible to store the optimal mapping tables for each zone on the recording surface. For example, the channel characteristics in a magnetic recording system are dependent on the radial distance of the data track from the center. In a particular example, the precoder logic may select a mapping table from a plurality of mapping tables based on a radial distance of the data track from the center for the purpose of mapping user bits to channel bits and vice versa. Moreover, in a particular example, the radial distance could be used to adaptively program a look-up table for use with a precoder and a SOVA detector.

Figure 7:
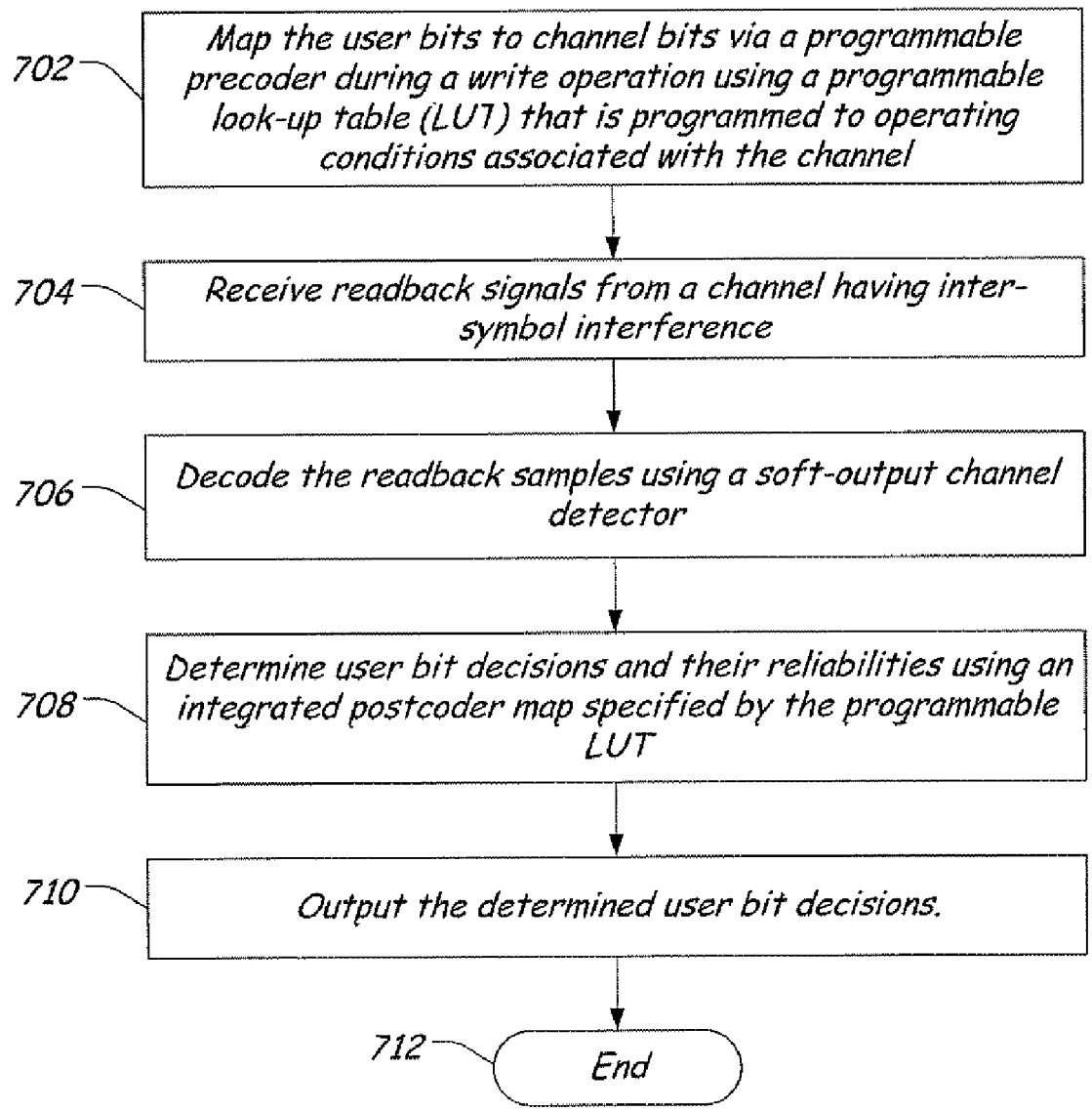
FIG. 7 is a flow diagram of a particular illustrative embodiment of a method of decoding a readback signal in a channel having correlated noise using a programmable precoder outside of the SOVA detector.

FIG. 7 is a flow diagram of a particular illustrative embodiment of a method of decoding a channel having correlated noise. At 702, user bits are mapped to channel bits via a programmable precoder during a write operation using a programmable look-up table (LUT) that is programmed to operating conditions associated with the channel. In a particular embodiment, the programmable precoder includes a processor and a memory accessible to the processor. The memory stores instructions executable by the processor to access instructions to map the user bits to the channel bits according to the programmable LUT.

Continuing to 704, readback samples are received from a channel having inter-symbol interference. Advancing to 706, the readback samples are decoded using a soft-output channel detector. In a particular example, the soft-output channel detector includes a high radix trellis and a sectional precoder. Moving to 708, user bit decisions and their reliabilities are determined using an integrated postcoder map specified by the programmable LUT. In a particular example, user bit decisions are determined by providing the readback signal to a soft-output Viterbi algorithm (SOVA) detector that includes the integrated postcoder map. In another particular example, the integrated post coder map is used to map the channel bits to user bits to make user bit decisions. Proceeding to 710, the determined user bit decisions are output. The method terminates at 712. In a particular embodiment, the method also includes error correction coding the output to produce a corrected output.

Figure 8:
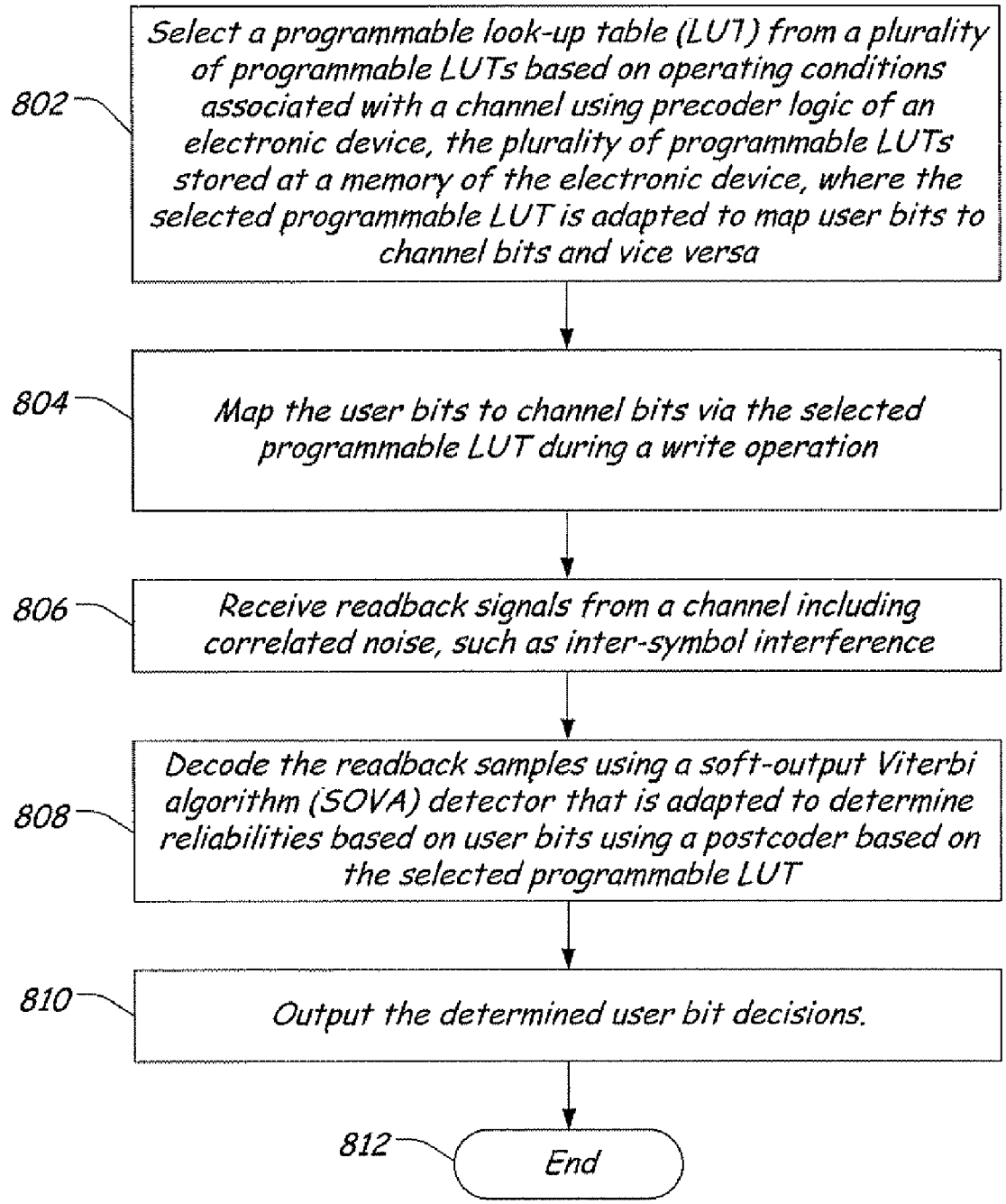
FIG. 8 is a flow diagram of another particular embodiment of a method of decoding a readback signal in a channel having correlated noise using a programmable precoder inside of the SOVA detector.

FIG. 8 is a flow diagram of another particular embodiment of a method of decoding a channel having correlated channel bit errors. At 802, precoder logic of an electronic device selects a programmable LUT from a plurality of programmable LUTs based on operating conditions associated with a channel, where the plurality of programmable LUTs stored at a memory of the electronic device, and where the selected programmable LUT is adapted to map user bits to channel bits and vice versa. In a particular example, the precoder logic can be adapted to receive servo control data associated with a radial position of the read/write head relative to a center of a disc platter of a disc drive and to select a particular programmable LUT based on the radial position. In another particular example, the precoder logic can be adapted to select a particular programmable LUT that is associated with a particular data source, such as a particular read/write head. In this example, each of the read/write heads of a storage device may have its own LUT that can be selectively activated to map user bits to channel bits and vice versa based on the source read/write head for the particular readback signal.

Moving to 804, user bits are mapped to channel bits via the selected programmable precoder during a write operation using the selected programmable LUT. Continuing to 806, readback samples are received from the channel, where the channel includes correlated noise, such as inter-symbol interference. Advancing to 808, the readback samples are decoded using a soft-output Viterbi algorithm (SOVA) detector that is adapted to determine reliabilities based on user bits using a postcoder based on the selected programmable LUT. In a particular example, the SOVA detector includes a high radix trellis and is adapted to communicate with a sectional precoder. Proceeding to 810, the determined user bit decisions are output. The method terminates at 812.

In general, while the above-discussion has described a programmable precoder used in connection with a soft-output Viterbi algorithm detector to reduce readback signal bit errors, it should be understood that the programmable precoder may be used with other detectors as well, provided the detectors are adapted for use with the programmable precoder. In a particular example, reliability data calculated from the outputs of the precoder can be based on an inverse mapping to the readback data that is derived from the LUT, rather than calculating reliabilities from the determined channel information. Further, it should be understood that the soft-output Viterbi detector, which is described with respect to FIGS. 1-8 above, works with an arbitrary radix trellis implementation and is not limited to a precoder section length.

Although the present invention has been described with reference to preferred embodiments, workers skilled in the art will recognize that changes may be made in form and detail without departing from the spirit and scope of the invention.

What is claimed is:

1. An assembly comprising:
a postcoder adapted to assign user bit labels from one or more look-up tables (LUTs) to each branch of a trellis;
the one or more look-up tables (LUTs) providing a relation between channel bits and user bits; and
a detector component configured to receive an input signal including one or more input channel bits and provide an output including one or more output user bits wherein the detector component uses the postcoder to decode the input signal using the user bits determined from the one or more LUTs in the branches of the trellis.

2. The assembly of claim 1, wherein the one or more LUTs defines a non-polynomial postcoder.

3. The assembly of claim 1, wherein the detector component comprises a soft-output Viterbi algorithm (SOVA) detector adapted to calculate a path metric difference between possible states of the user bits using the postcoder and the one or more LUTS, based upon reliabilities of the user bits and adapted to update reliabilities of the user bits based on the path metric difference.

4. The assembly of claim 3 comprising an inner decoder configured to receive the user bits and the reliabilities of the user bits and output decoded user data using a message passing algorithm to interface with the SOVA detector.

5. The assembly of claim 1 wherein the postcoder is configured to select one of a plurality of LUTs stored in memory based upon operating conditions and the postcoder includes logic to select the one of the plurality of LUTs to decode the input signal.

6. The assembly of claim 1, wherein the postcoder comprises logic adapted to access the one or more LUTs.

7. The assembly of claim 1 wherein the detector component forms a component of a magnetic recording channel wherein the input signal is received from a magnetic recording head.

8. The assembly of claim 1, wherein the detector component includes a soft-output Viterbi algorithm (SOVA) detector adapted to operate using the user bit labels.

9. The assembly of claim 8, wherein the SOVA detector uses the postcoder to compute reliabilities of the user bits.

10. The assembly of claim 1, wherein the one or more LUTs are programmed to operating conditions associated with a read channel of the assembly.

11. A method comprising:
mapping user bits to channel bits via a precoder during a write operation using one or more look-up tables (LUTs);
receiving from a channel readback samples including one or more of the channel bits;
decoding the readback samples using a soft-output channel detector which interfaces with a postcoder;
assigning user bit labels to branches of a trellis using a postcoder map;
determining user bit decisions and their reliabilities for the readback samples based upon a likelihood path metric using the trellis and the postcoder map specified by the one or more LUTs; and
outputting the determined user bit decisions.

12. The method of claim 11, wherein the postcoder comprises logic and a memory accessible to the logic, wherein the one or more LUTs are programmed in the memory.

13. The method of claim 11, comprising providing the readback samples to a soft-output Viterbi algorithm (SOVA) detector and using the postcoder map to determine the user bit decisions.

14. A system comprising:
an input to receive a signal;
a channel detector coupled to the input, the channel detector comprising:
a memory including one or more look-up tables LUTs that provide a relation between channel bits and user bits programmed in the memory;
a postcoder having access to the memory and adapted to map the channel bits to the user bits and adapted to assign user bit labels from the one or more LUTs to each branch of a trellis;
a decoder adapted to iteratively decode one or more channel bits of the input signal into user bit decisions using the user bit labels from the postcoder in branches of the trellis; and
an output terminal to provide an output including the user bit decisions.

15. The system of claim 14 wherein the postcoder comprises a processor and instructions in the memory executable by the processor to map the channel bits to the user bits.

16. The system of claim 14, wherein the postcoder comprises logic, and wherein the relation between the channel bits and the user bits is provided by the one or more look-up tables (LUTs) accessible to the logic to map the channel bits to the user bits.

17. The system of claim 16, wherein the decoder comprises a soft-output Viterbi algorithm (SOVA) decoder.

18. The system of claim 16, wherein the one or more LUTs include a plurality of LUTs that provide the relation between the channel bits and the user bits dependent upon a data track position on a rotating storage media.

* * * * *